United States Patent [19]

Adamini

[11] Patent Number: 5,660,606
[45] Date of Patent: Aug. 26, 1997

[54] INFLATOR FILTER FOR PRODUCING HELICAL GAS FLOW

[75] Inventor: Chris A. Adamini, Sterling Heights, Mich.

[73] Assignee: Automotive Systems Laboratory, Inc., Farmington Hills, Mich.

[21] Appl. No.: 584,737

[22] Filed: Jan. 11, 1996

[51] Int. Cl.$^6$ .............................. B01D 45/16; B01D 46/40
[52] U.S. Cl. ..................... 55/337; 55/385.3; 55/498; 55/520; 55/526; 55/DIG. 5; 280/740
[58] Field of Search ............... 55/336, 337, 385.3, 55/447, 492, 498, 520, 525, 526, 318, 320–322, 332, DIG. 5; 280/736–741, 743.1

[56] References Cited

U.S. PATENT DOCUMENTS

| | | | |
|---|---|---|---|
| 1,898,027 | 2/1933 | Winslow | 55/520 X |
| 2,400,076 | 5/1946 | Dauster | 55/520 X |
| 2,400,180 | 5/1946 | Venable | 55/520 X |
| 3,076,554 | 2/1963 | Bub | 55/520 X |
| 3,400,516 | 9/1968 | DeLeon | 55/337 X |
| 3,646,724 | 3/1972 | Peck | 55/318 X |
| 3,853,512 | 12/1974 | Hayashi | 55/337 X |
| 4,005,876 | 2/1977 | Jorgensen et al. | 280/741 |
| 4,012,211 | 3/1977 | Goetz | 55/385.3 X |
| 4,017,100 | 4/1977 | Gehrig et al. | 55/385.3 X |
| 4,310,419 | 1/1982 | Nara et al. | 55/520 X |
| 5,048,862 | 9/1991 | Bender et al. | 280/741 X |
| 5,100,171 | 3/1992 | Faigle et al. | 280/741 X |
| 5,113,671 | 5/1992 | Westermeyer | 55/337 X |
| 5,122,270 | 6/1992 | Ruger et al. | 55/520 X |
| 5,130,100 | 7/1992 | Serizawa | 55/385.3 X |
| 5,184,846 | 2/1993 | Goetz | 280/741 X |
| 5,248,162 | 9/1993 | Levosinski et al. | 55/498 X |
| 5,456,069 | 10/1995 | Haerle | 55/520 X |
| 5,466,420 | 11/1995 | Parker et al. | 280/736 X |
| 5,482,316 | 1/1996 | Lang et al. | 280/741 |
| 5,503,806 | 4/1996 | Fulmer et al. | 280/736 X |
| 5,562,303 | 10/1996 | Schleicher et al. | 280/736 |

FOREIGN PATENT DOCUMENTS

| | | | |
|---|---|---|---|
| 0034876 | 4/1952 | Poland | 55/520 |
| 1510889 | 9/1989 | U.S.S.R. | 55/337 |

*Primary Examiner*—Robert Spitzer

[57] ABSTRACT

A filter (20) for use in an inflator assembly (10) is formed by combining a layer of filter media (22) with a barrier element such as metal foil sheet backing (24), and then subsequently wrapping the filter a plurality of times about a combustion chamber (16) located within the inflator assembly (10). The foil sheet backing (24) creates a barrier which causes the inflation gases to travel in a helical path about the combustion chamber (16). By providing a helical gas flow path, the filter (20) extends the filter path length without increasing overall dimensioning requirements of the filter, and produces centrifugal forces which improve particulate removal.

4 Claims, 1 Drawing Sheet

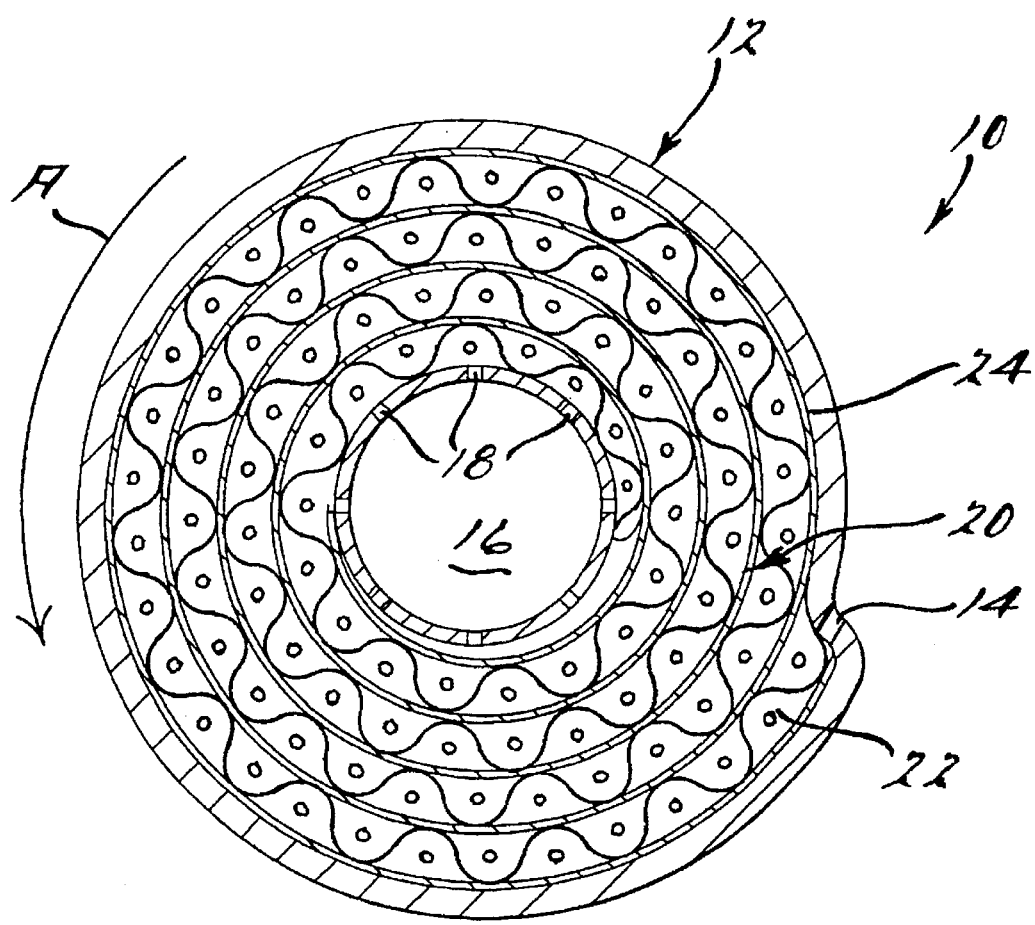

INFLATOR FILTER FOR PRODUCING HELICAL GAS FLOW

BACKGROUND OF THE INVENTION

The present invention relates generally to inflatable safety restraint systems such as utilized to protect vehicle occupants during a collision, and more particularly to filters which effect treatment of the gases produced by the inflator.

Generally, known vehicle occupant safety restraint systems are usually arranged so that at least one gas generator or inflator is in fluid communication with an inflatable air bag. The inflator typically includes an explosive "squib" which is triggered by an air bag firing circuit upon detection of a vehicle collision warranting deployment of the air bag.

Inflators typically fall into one of three varieties, i.e., stored gas type, pyrotechnic type, or a hybrid type, which is basically a combination pyrotechnic and stored gas inflator. A drawback inherent to both the pyrotechnic and hybrid type of inflators is the generation of combustion products, such as particulate and molten materials, which must be removed from the inflating gas prior to the gas entering the air bag. To that end, most known inflators employ some form of filtering structure which creates a tortuous gas flow path to trap or otherwise remove the particulate and molten material.

For example, one known hybrid inflator arrangement disclosed in U.S. Pat. No. 5,184,846 to Goetz utilizes an angled exhaust conduit connected to the pyrotechnic combustion chamber and positioned within the inflator housing so as to effect an helical/tortuous gas flow path. The helical path creates a centrifugal force which causes the heavier particulate and molten materials to flow radially outward into engagement and entrapment against the inner housing wall. While the helical gas flow path by itself provides a means for removing some of the particulate and molten material, it may not be sufficient to remove all the undesired and potentially hazardous particulate and molten material entrained in the inflation gas.

SUMMARY OF THE INVENTION

Therefore, an object of the present invention is to provide an inflator filter having improved filtering capabilities.

Another object of the present invention is to provide an inflator filter which has a larger filtering capability per given volume of filter.

Another object of the present invention is to provide an inflator filter which increases the length of the gas flow path without increasing the size of the inflator housing.

Yet another object of the present invention is to provide an inflator filter which can create a helical gas flow path to improve particulate removal.

In accordance with these and other objects, the present invention provides a filter for use in an inflator having a housing, a combustion chamber located within the housing, and at least one gas discharge orifice in the housing to permit the flow of gas generated by combustion of a propellant charge within the combustion chamber to exit the housing, wherein the filter comprises a layer of filter media combined with a barrier element extending along a single facing of the filter media. The layer of filter media is wrapped a plurality of times about the combustion chamber with the barrier element facing outwardly so as to provide a helical gas flow path between the combustion chamber and the at least one gas discharge orifice. In one embodiment, the barrier element comprises a metal foil sheet.

The present invention will be more fully understood upon reading the following detailed description of the preferred embodiment in conjunction with the accompanying drawings.

BRIEF DESCRIPTION OF THE DRAWINGS

The FIGURE is a cross section of an exemplary inflator structure illustrating the filter of the present invention.

DETAILED DESCRIPTION OF THE PREFERRED EMBODIMENT(S)

Referring to the FIGURE, there is shown a cross section of a gas inflator assembly 10 for use in inflating a vehicle occupant safety restraint, such as an air bag (not shown). The inflator assembly includes a housing 12, such as forged from aluminum, and at least one gas discharge orifice 14 located therein so as to be in fluid communication with the air bag. A combustion chamber 16 is positioned within the housing 12 to support a propellant charge therein. A squib or igniter (not shown) is electrically triggered by a firing circuit to effect ignition of the propellant charge as is generally well understood by one having ordinary skill in the art. The gas generated by the propellant charge radially exits the combustion chamber 16 via a plurality of apertures 18.

In accordance with the present invention, a filter 20 is radially wrapped or spooled in multiple layers about the combustion chamber 16 so as to define a helically extending passageway for the gas to flow from the combustion chamber 16 to the gas discharge orifices 14. The filter 20 is constructed of a layer of filter media 22, such as formed from one or more layers of mesh wire having a wire diameter of 0.58 mm ($\approx$0.023 in), with one facing being covered with a barrier element/backing 24 formed from for example a metal foil sheet. The foil sheet backing 24 can be affixed to the wire mesh filter media 22 in any suitable manner known to one of ordinary skill, such as by tack or spot welding.

In operation, the foil sheet back 24 functions as a flow barrier between separate layers of filter media, thereby forcing the inflating gas to flow radially about the combustion chamber 16 (as illustrated by arrow A in the drawing), as opposed to divergently from the combustion chamber as done in conventional inflator filters. Thus, the filter 20 of the present invention advantageously increases the filtering path length without increasing the overall size of the filter structure and its relative space requirements within the inflator housing 12. In addition, the circumferential or helical flow path inherently enhances the filter's ability to remove combustion particulates due to centrifugal forces causing the heavier particulates to be flung outwardly into the filter media 22 where they remain entrapped.

It is further noted that the creation of the helical flow path by the present invention provides yet another advantage in that the helical flow path inherently introduces a time delay for a portion of the inflation gas to reach the air bag. This in turn lowers the onset pressurization of the air bag, thereby "softening" the inflator's inflation profile to minimize the risk of injury to an out-of-position occupant from the initial impact force of the air bag as it inflates.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

I claim:

1. A filter for use in an inflator assembly having a housing, a combustion chamber located within said housing, and at least one gas discharge orifice in said housing to permit the flow of gas generated by combustion of a propellant charge within said combustion chamber to exit said housing, said filter comprising:

a layer of filter media having a gas impervious barrier element extending along a single facing thereof, wherein said layer of filter media is wrapped a plurality of times about said combustion chamber with said barrier element positioned to isolate each respective layer of filter media to create a helical gas flow path between said combustion chamber and said at least one gas discharge orifice.

2. The filter of claim 1 wherein said barrier element comprises a metal foil sheet.

3. A method of producing a helical gas flow in a gas inflator assembly, wherein said assembly comprises a housing, a combustion chamber located within said housing, and at least one gas discharge orifice in said housing, said method comprises the steps of:

forming a helical filter by placing a gas impervious barrier element on a single surface of a layer of filter media, and radially wrapping said layer of filter media about itself to form multiple layers having a single and continuous radial flow path;

positioning said helical filter within said housing so as to be in fluid communication with said combustion chamber and said at least one gas discharge orifice, wherein said radial flow path produces a centrifical force to improve capture of combustion particulates in the filter media.

4. The method of claim 3 wherein said step of placing a gas impervious barrier element comprises affixing a metal foil sheet to one surface of said layer of filter media prior to said wrapping step.

* * * * *